United States Patent [19]

Hoffmann

[11] Patent Number: 4,582,656

[45] Date of Patent: Apr. 15, 1986

[54] METHOD OF PRODUCING MOLDED ARTICLES FROM POLYOLEFIN MOLDING COMPOSITIONS CROSSLINKED BY IRRADIATION

[75] Inventor: Manfred Hoffmann, Ochtrup, Fed. Rep. of Germany

[73] Assignee: Hewing GmbH & Co., Ochtrup, Fed. Rep. of Germany

[21] Appl. No.: 405,661

[22] Filed: Aug. 6, 1982

[30] Foreign Application Priority Data

Aug. 12, 1981 [DE] Fed. Rep. of Germany ....... 3131812

[51] Int. Cl.[4] ................................................. B06B 1/00
[52] U.S. Cl. ..................................... 264/22; 264/159; 525/222; 525/153; 525/161
[58] Field of Search ................................. 264/22, 159; 204/159.17, 159.2; 525/222, 240

[56] References Cited

U.S. PATENT DOCUMENTS

| | | | |
|---|---|---|---|
| 3,387,065 | 6/1968 | Derbyshire et al. | 264/22 |
| 3,433,573 | 3/1969 | Holladay et al. | 525/240 |
| 3,770,852 | 11/1973 | Hager et al. | 525/222 |
| 3,941,859 | 3/1976 | Batiuk et al. | 525/222 |
| 4,049,757 | 9/1977 | Kammel et al. | 264/22 |
| 4,124,655 | 11/1978 | Koehnlein | 260/878 R |
| 4,126,649 | 11/1978 | Decroix | 525/222 |
| 4,220,730 | 9/1980 | Coyne | 264/22 |
| 4,367,185 | 1/1983 | Nojiri et al. | 264/22 |

FOREIGN PATENT DOCUMENTS

| | | |
|---|---|---|
| 2602689 | 7/1977 | Fed. Rep. of Germany . |
| 2757820 | 7/1978 | Fed. Rep. of Germany . |
| 3131812 | 6/1983 | Fed. Rep. of Germany . |

*Primary Examiner*—Paul Lieberman
*Assistant Examiner*—W. Thompson
*Attorney, Agent, or Firm*—Felfe & Lynch

[57] ABSTRACT

A method of producing molded articles from polyolefin molding compositions crosslinked by irradiation, to which molding composition is added, prior to irradiation, by mixing and/or copolymerizing, from 0.3 to 20 percent by weight of vinylacetate, optionally in a form as pre-copolymerized with a polyolefin. The occurence of undesirable accumulations and discharges of electrical charge concentrations and/or the undesirable foaming of the polyolefin molded articles will thus be suppressed.

2 Claims, No Drawings

METHOD OF PRODUCING MOLDED ARTICLES FROM POLYOLEFIN MOLDING COMPOSITIONS CROSSLINKED BY IRRADIATION

The present invention relates to a method of producing molded articles from polyolefin molding compositions crosslinked by irradiation, to which molding composition is added, prior to irradiation, at least one substance intended to prevent the occurrence of undesirable accumulations and discharges of electrical charge concentrations and/or to suppress or eliminate the undesirable foaming of polyolefin molded articles during irradiation.

Discharges of charge concentrations interiorly of solid material molded articles, known as the Lichtenberg effect, result in the formation of cavities or channels, and particularly cause fine holes in the wall of hollow sections, e.g. tubes.

The term polyolefin, as used herein includes polymers of olefinic-hydrocarbons, primarily of ethylene (polyethylene, PE) and propylene (polypropylene, PP), but also of the isobutylene, butene-(1), pentene, methylpentene and others, as well as copolymers thereof, for example, ethylene-propylene copolymers.

Laid-open German patent application (DE-OS) No. 27 57 820 shows to be known a method of improving molded articles, made from molding compositions irradiated with high-energy electrons by adding to the molding compositions prior to the irradiation thereof a miscible compound having the general formula X-Ym in which:

X is a group without an acetylene bond;
Y is a radical containing an acetylene bond; and
m is an integer equal to 1 or higher, and further adding thereto as a thermal aging stabilizer, a substance having the designation Tetrakis-[methylene-(3,5 di-tert.-butyl-4-hydroxy-hydrocinnamate)]-methane. As said substance X-Ym, there are used acetylenic compounds, such as, for instance, dipropargyl maleate (DPM), dipropargyl succinate (DPS) or diallyl maleate (DM). In particular, the conventional method is used for the production of cable sheathings.

It has been found that the acetylenic compounds to be employed are not easily available. At the present time, these compounds have a high price which increases the costs of, for example, the production of radiation-crosslinked polyethylene hot water pipes for floor heating systems to such a degree that the production becomes uneconomical.

Accordingly, it is the object of the present invention to provide, as a substitute for the conventional substances to be admixed, other substances which are likewise capable of preventing the formation or discharge of electrical charge concentrations and/or the undesirable foaming, but which may be procured in higher quantities and which, further, do not substantially contribute to the price of the product.

This object is achieved by the admixing and/or copolymerizing from 0.3 to 20 percent by weight of vinylacetate

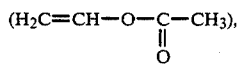

optionally in a form as pre-copolymerized with a polyolefin. The resulting mixture is molded into the desired shape, and the desired molded articles are irradiated with electron rays.

As far as observed, the mixtures and the copolymers show an increased dielectric constant $\epsilon_r$ and an increased dielectric dissipation factor $\tan \delta$.

Thus, according to the present invention, it is not necessary to use two additional substances; rather, the readily available and inexpensive compound vinylacetate is employed. Molded articles of PE molding compositions to which vinylacetate is added exhibit a clearly reduced accumulation of internal electrical charges during the irradiation process, as compared to molded articles formed of pure PE. The accumulation of electrical charges may even be suppressed almost completely. Provided that a sufficient amount of vinylacetate has been added, the crosslinking reaction is greatly promoted with the same intensity of radiation; this means that adequate crosslinking of the molded articles will be obtained with a lower dose of radiation. This lower radiation intensity (energy) has the further effect of likewise substantially suppressing or eliminating heat accumulation and foaming. Furthermore, it is also of advantage that smaller amounts of the thermal aging stabilizer, which is normally added to polyolefin molded compositions, are consumed owing to the lower intensity of radiation, whereby the molded articles produced in this way show an excellent thermal aging resistance, i.e. stability to thermal oxidation.

In this connection, published German patent application (DE-AS) No. 26 02 689 discloses a PE molding composition comprising an ethylene-vinylacetate copolymer, a polymeric antioxidant as well as sulfur as thermal aging stabilizers, and triallyl cyanurate (TAC) as a polyfunctional monomer increasing the crosslinking efficiency. It has been found that, when molded articles of this molding composition are irradiated, owing to the very high crosslinking efficiency, i.e. with a given degree of crosslinking requiring a lower dose of radiation, foaming of the molded article can be prevented from occuring, but not a charge accumulation and discharge with the generation of Lichtenberg's figures. Also, it is known from the literature that during the irradiation of molded articles of PE molding compositions having TAC added thereto, discharges with the generation of Lichtenberg's figures may occur already at relatively low doses of radiation.

Presumably, the action during irradiation of the vinylacetate added is due to the $CH_3$ groups of the acetate groups which are preferred for the crosslinking reactions because they have a higher mobility of the $CH-$ and $CH_2$-groups present in the chain. Thus, in comparison with the irradiation of pure PE, a greater number of electrons are required for radical formation, and charge accumulations are eliminated.

Further, it cannot be excluded that dielectric effects, such as, for example, a reorientation of the existing permanent dipoles of the acetate groups, and, thus, an increase of the dielectric dissipation factor $\tan \delta$ may occur, or that the provision of electron levels (i.e. traps) in the PE by the admixed vinylacetate, like an improvement of the D.C. conductivity, prevents the occurence of higher local charge accumulations and results in a slow discharge without causing Lichtenberg's figures.

The action of the vinylacetate will start at a content of about 0.2 percent by weight. Although smaller quantities might be effective to bring about a slight improvement, such improvement is not distinct enough, that the effort of the admixing would pay.

Similarly, mixing quantities of above 20 percent by weight are conceivable but, these quantities might undesirably affect the properties of the polyolefins, such that greater quantities of addition are considered to be not expedient under economical and technical aspects.

Further, it may be noted that the term "polyolefinic molding compositions," as used herein, includes also compositions which do not consist 100% of polyolefins, but which have added thereto, for example, antioxidants, stabilizers, plastifiers, and small amounts of fillers; in such case, however, interactions with the aforementioned vinylacetate must be taken into account in some instances.

Below, the invention is explained by means of Examples:

EXAMPLE 1

0.9 percent by weight of vinylacetate are added to a high molecular PE of high density (Lupolen 4261A of the BASF company), namely in the form of 5 percent by weight of an ethylene-vinylacetate copolymer (Lupolen 3920 D of BASF containing 18 percent by weight of vinylacetate, in which instance the two Lupolen species may be readily mixed with each other and extruded. The pellets of the two PE species are blended with 0.4 percent by weight of commercially available antioxidants, mixed together and extruded in conventional manner at 200° C. (±10° C.).

The extrusion product is a tube having an outer diameter of 18 mm and a wall thickness of 2 mm. With a pressed board, formed from the abovementioned mixture, a dielectric number or relative permittivity, $\epsilon_r = 2.6$ and a dielectric dissipation factor tan $\delta$ of $1.5 \cdot 10^{-2}$ at $10^6$ Hz are measured.

Irradiation is effected with a radiation intensity of 1.5 MeV and 50 mA. The dose applied during the irradiation amounted to about 15 Mrad.

The following values were determined for the irradiated PE: Gel fraction according to (German Standard) DIN 16892 E: 79%

Foaming was not observed. Lichtenberg's short-circuiting figures could not be observed.

COMPARATIVE EXAMPLE 1

Tubes of 18 mm outer diameter and 2 mm wall thickness and made of a high molecular, high density polyethylene (Lupolen 4261 A)—see Example 1—were produced without the addition of vinylacetate, but with the addition of 0.4 percent by weight of antioxidants, by an extrusion process at 210° C. A relative permittivity of $\epsilon_r = 2.4$ and a dielectric dissipation factor tan $\delta$ of $2 \cdot 10^{-4}$ at $10^6$ Hz were measured with a pressed board formed from this molding composition.

Upon irradiation with the same radiation intensity as in Example 1, the gel fraction amounted to only 70%. In this instance, Lichtenberg's short-circuits figures, i.e. fine holes, were formed in the tube at spacings of several meters. Foaming, i.e. bubble formation in the tube wall could not be found to occur. A gel fraction of 79%, as according to Example 1, was obtained only with a substantially higher dose of radiation of 18 Mrad. Foaming did not occur; however, numerous Lichtenberg's short-circuit figures per meter of tube length were observed.

It can be seen from the Examples compared with each other, that the addition of vinylacetate in a quantity of as low as 0.9% is effective to avoid the Lichtenberg's short circuit figures and allows to greatly reduce the dose of radiation. For obtaining the same gel fraction, the period of irradiation may be greatly shortened.

COMPARATIVE EXAMPLE 2

A tube of 18 mm outer diameter and 2 mm wall thickness was produced by the extrusion process from high molecular, high density PE (Lupolen 4261 A) with the addition of 0.9 percent by weight of vinylacetate (5 percent by weight of Evathene 538/539; ethylene-vinylacetate copolymer of ICI Chemicals) and 2% of triallyl cyanurate as well as 0.4 percent by weight of an antioxidant. Subsequently, the tube was irradiated at an acceleration voltage of 1.5 MeV and a current of 50 mA. The radiation dose applied was 15 Mrad. The gel fraction of the irradiated tube was determined to be 89%. Foaming was not noted, but numerous Lichtenberg's figures per meter of tube length were found. The number of the fine hole in the tube wall caused by this phenomenon even exceeded the fine hole number to be found upon the irradiation of tubes of polyethylene containing no additives.

This Example reveals that the advantages according to the invention regarding the prevention of the Lichtenberg's short-circuiting effect by admixture of, for example, vinylacetate may be even negated if other additives are used which are unsuitable for the intended purpose.

EXAMPLE 2

99.1% of a copolymer consisting of 50% of PE and 50% of PP are mixed with 0.9% of vinylacetate and extruded in accordance with Example 1. With the same dose of radiation and with the use of the same measuring equipment, Lichtenberg's figures and foaming could not be noted, either.

The above Examples and Comparative Examples reveal that a substantial improvement of the irradiation properties or characteristics can be obtained by the addition of vinylacetate. In particular, the period of irradiation may be greatly reduced for obtaining the same gel fraction.

EXAMPLE 3

A mixture of ethylene-monomer was heated together with 1.2% p.w. of vinylacetate-monomer in a closed vessel up to 200° C. at a pressure of 2,000 (two thousand) bars, thereby co-polymerizing in a known manner. The co-polymer yielded has a content of about 1% p.w. acetate-groups. It was cooled and afterwards extruded at a temperature of 120° C. and an extrusion-pressure of 35 bar, and formed into a tube.

Said tube was irradiated at an acceleration voltage of 1.5 MeV and a current of 50 mA. The radiation dose was 15 Mrad. Foaming and Lichtenberg's short-circuit figures practically did not occur.

I claim:

1. In the method of producing an essentially pin-hole free tubing made of polyethylene or a composition of polyethylene and polypropylene wherein said tubing is essentially water-tight and wherein said tubing is highly stable to thermal oxidation by molding polyethylene or a composition of polyethylene and polypropylene wherein the polypropylene is present in the composition in an amount less than 50% into a tube and cross-linking the tube by electron ray irradiation, the improvement for preventing accumulations and discharges of electrical charge concentration, suppressing or eliminating foaming or heat accumulation and achieving a higher yield of cross-linking events at the same dose of radiation during irradiation to produce said tubing said improvement comprising adding to the composition prior to molding and irradiation from 0.3 to 1.2% by weight of vinylacetate monomer which is subsequently copolymerized with said polyethylene or said composition of polyethylene and polypropylene wherein the polypropylene is present in an amount less than 50%.

2. The method of claim 1 wherein the added vinylacetate is in a monomeric form or in a form precopolymerized with polyethylene or polypropylene.

* * * * *